April 25, 1967 K. BOFINGER ET AL 3,315,626
APPARATUS FOR PRODUCING COLLAPSED BEADS IN CAN BODIES
Filed July 23, 1964

INVENTORS
KARL BOFINGER
HAROLD RICHARD VITENSE
BY Robert P. Auber
ATTORNEY

April 25, 1967   K. BOFINGER ET AL   3,315,626
APPARATUS FOR PRODUCING COLLAPSED BEADS IN CAN BODIES
Filed July 23, 1964   14 Sheets-Sheet 4

INVENTORS
KARL BOFINGER
HAROLD RICHARD VITENSE
BY
Robert P. Auber
ATTORNEY

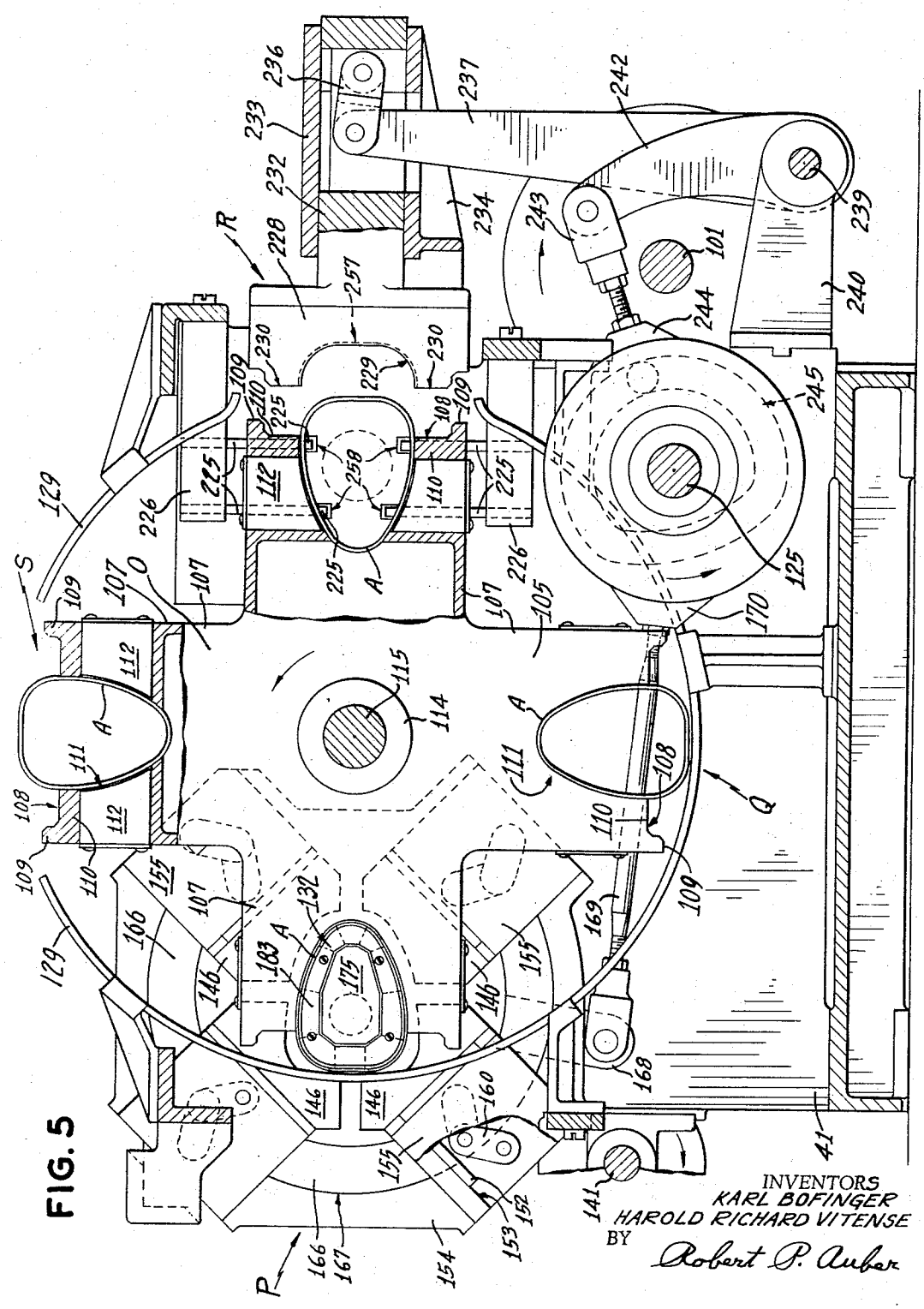

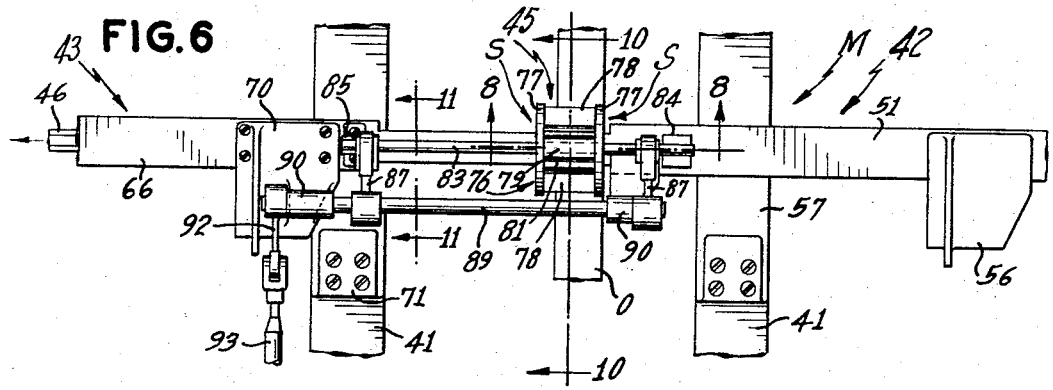
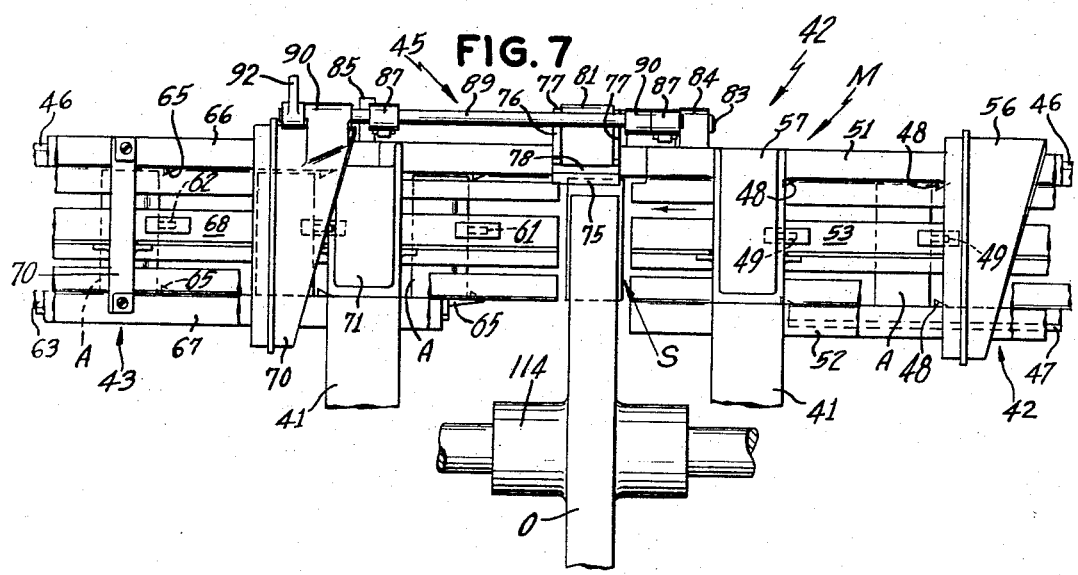
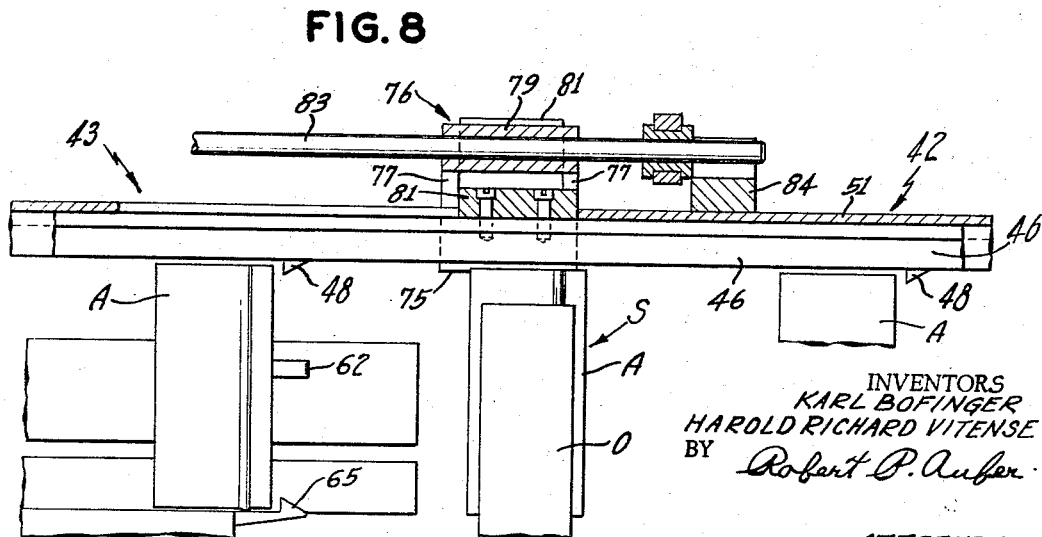

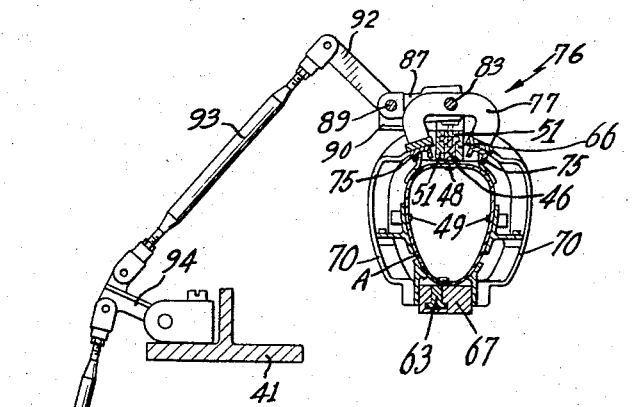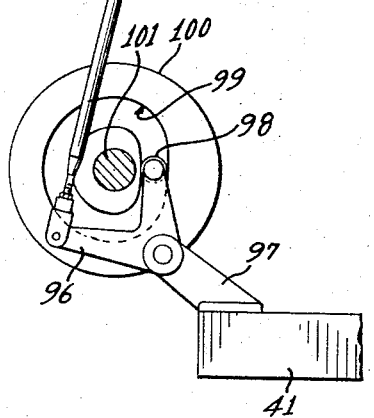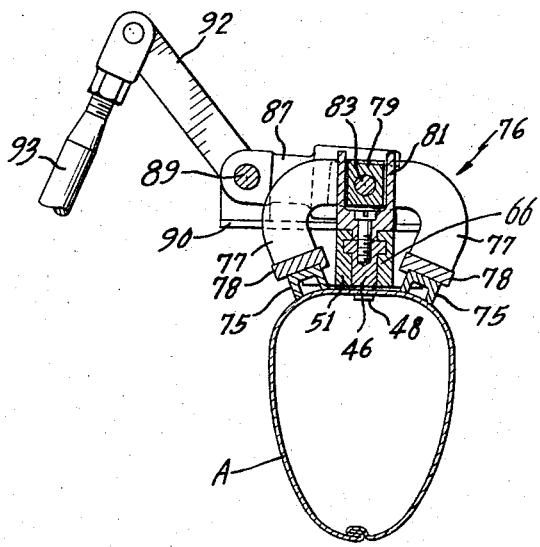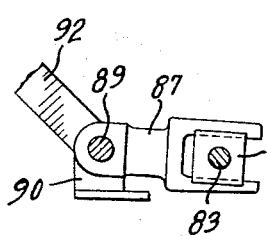

April 25, 1967 K. BOFINGER ET AL 3,315,626
APPARATUS FOR PRODUCING COLLAPSED BEADS IN CAN BODIES
Filed July 23, 1964 14 Sheets-Sheet 8

INVENTORS
KARL BOFINGER
HAROLD RICHARD VITENSE
BY Robert P. Aufer
ATTORNEY

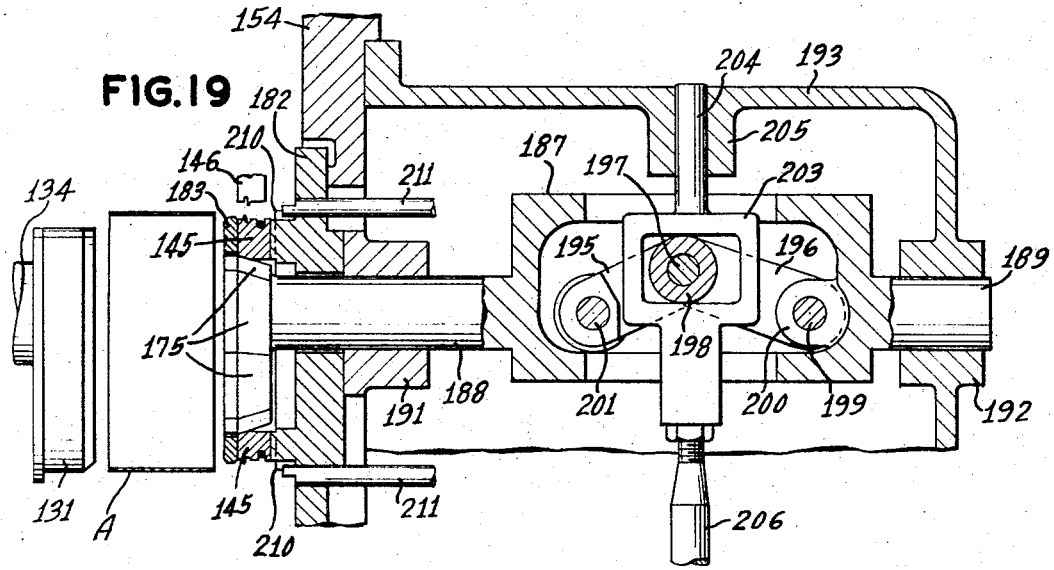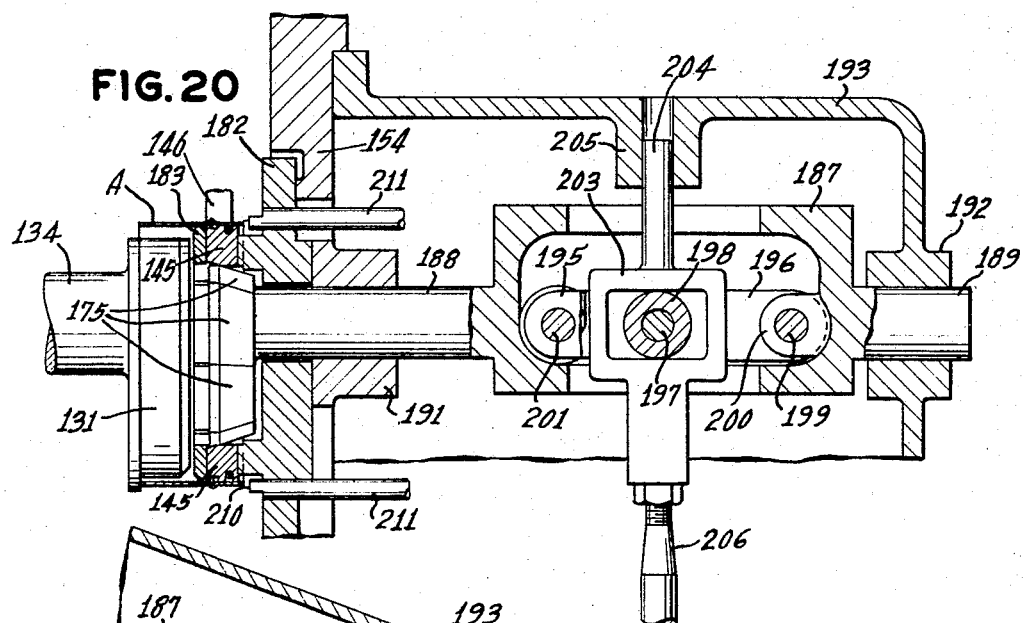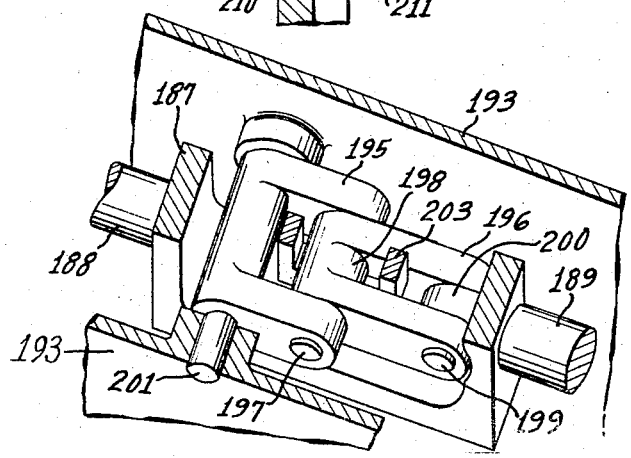

April 25, 1967 K. BOFINGER ET AL 3,315,626
APPARATUS FOR PRODUCING COLLAPSED BEADS IN CAN BODIES
Filed July 23, 1964 14 Sheets-Sheet 11
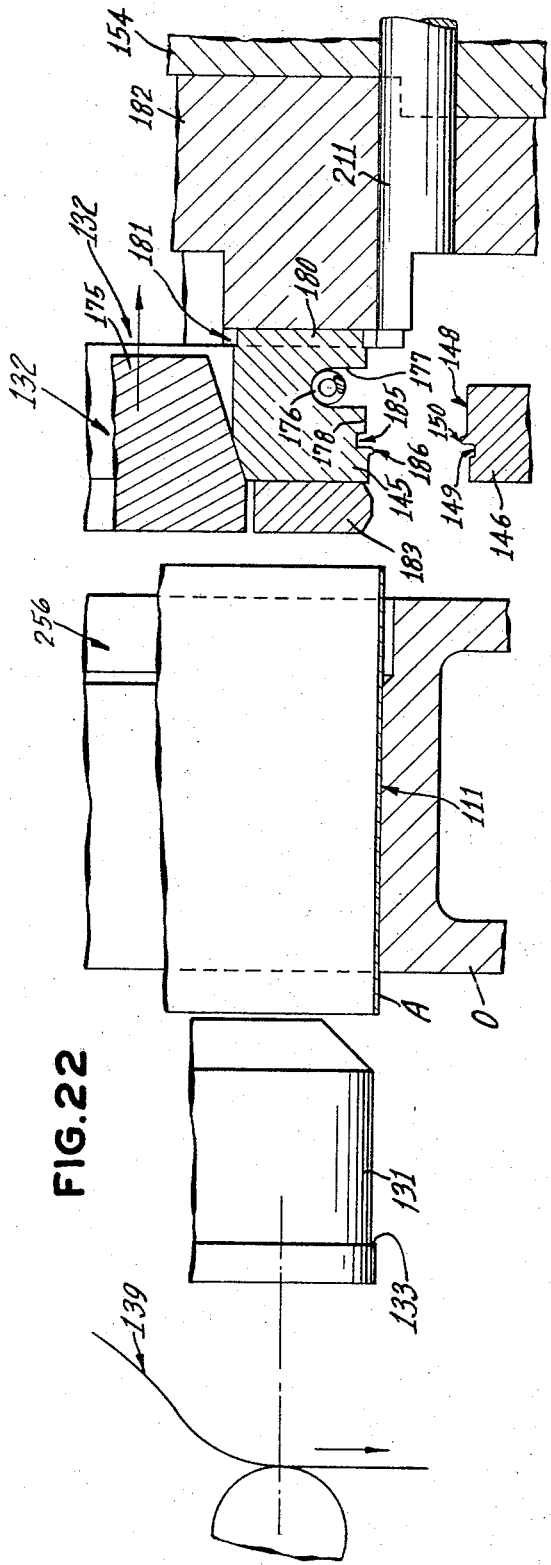
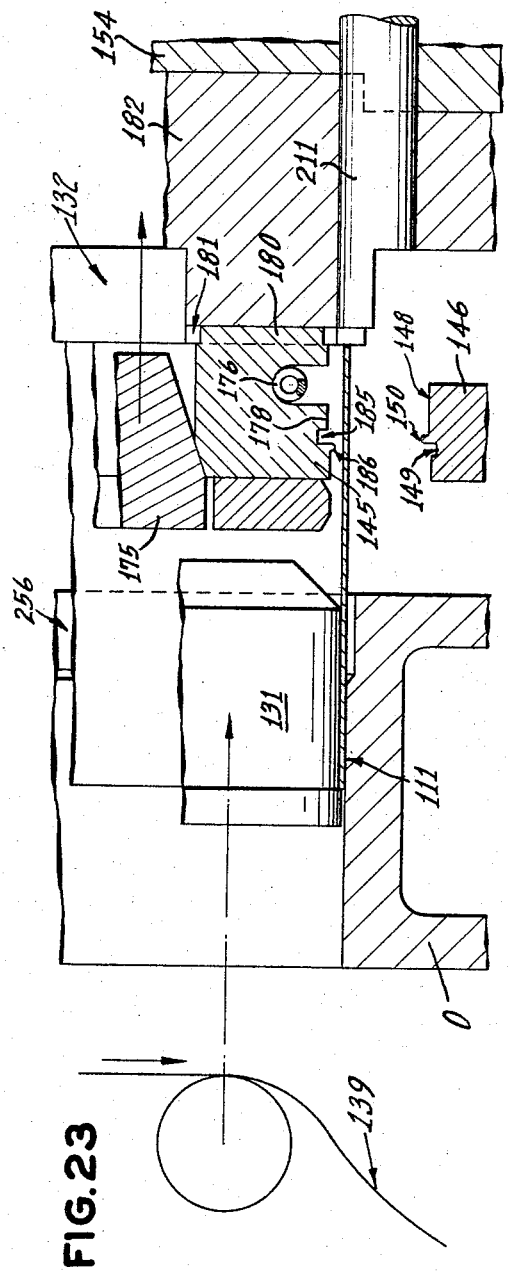
INVENTORS
KARL BOFINGER
HAROLD RICHARD VITENSE
BY Robert P. Auber
ATTORNEY April 25, 1967 K. BOFINGER ET AL 3,315,626
APPARATUS FOR PRODUCING COLLAPSED BEADS IN CAN BODIES
Filed July 23, 1964 14 Sheets-Sheet 12

INVENTORS
KARL BOFINGER
HAROLD RICHARD VITENSE
BY
*Robert P. Auber*

ATTORNEY

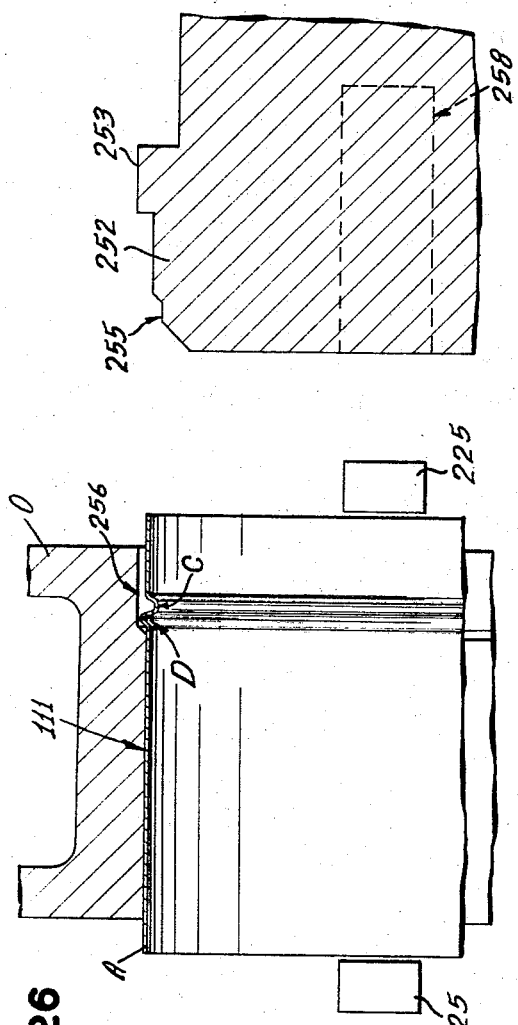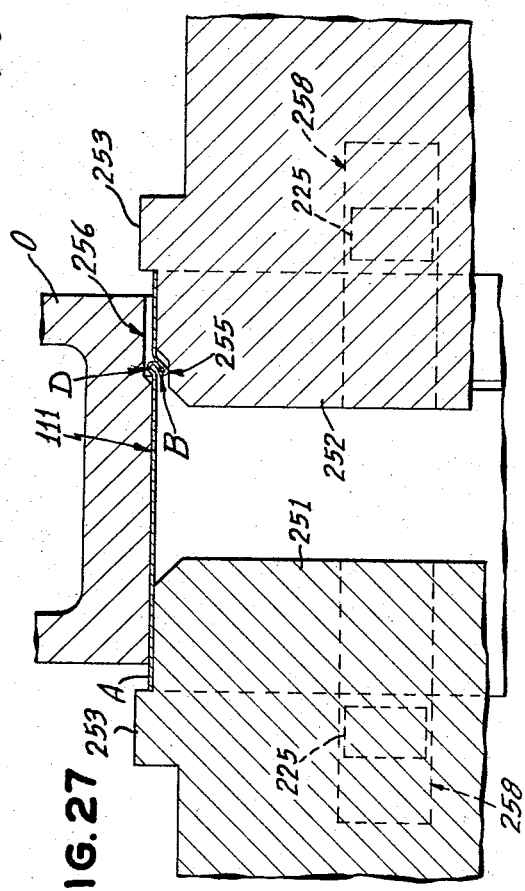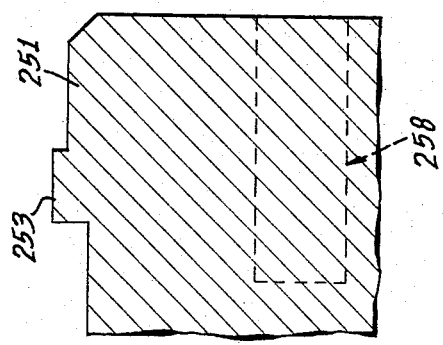

April 25, 1967 K. BOFINGER ET AL 3,315,626
APPARATUS FOR PRODUCING COLLAPSED BEADS IN CAN BODIES
Filed July 23, 1964 14 Sheets-Sheet 14

INVENTORS.
KARL BOFINGER
HAROLD RICHARD VITENSE
BY Robert P. Auber
ATTORNEY

United States Patent Office 3,315,626
Patented Apr. 25, 1967

3,315,626
APPARATUS FOR PRODUCING COLLAPSED
BEADS IN CAN BODIES
Karl Bofinger, Barrington, and Harold Richard Vitense, Mundelein, Ill., assignors to American Can Company, New York, N.Y., a corporation of New Jersey
Filed July 23, 1964, Ser. No. 384,629
14 Claims. (Cl. 113—1)

The present invention relates to an apparatus for making can or container bodies and the like and has particular reference to mechanism for producing a collapsed bead in such bodies.

In the manufacture of certain containers, especially those which are adapted to be opened by the tearing away of a scored strip provided in the bodies of the containers, it is often desirable to provide an annular folded wall section or collapsed bead in the bodies to serve as a repository for at least one of the score lines and/or serve as a collar or seat for reclosure members for the opened containers. Such folded wall sections or collapsed beads are also used for reinforcing the container bodies.

An example of such a collapsed bead construction is disclosed in U.S. Patent 3,055,539 issued September 25, 1962, to W. F. Pillnik on Metal Container in which an outer portion of the collapsed bead serves as a backing and shield for the raw edge of the body produced by removal of a tearing strip partially defined by a score line located adjacent the bead.

An object of the instant invention is to provide an apparatus for producing such a collapsed bead in a can body in a highly efficient manner and at high speed rates of production so as to reduce the cost of maufacture of this type of container.

Numerous other objects and advantages of the invention will be apparent as it is better understood from the following description, which, taken in connection with the accompanying drawings, discloses a preferred embodiment thereof.

The above object is accomplished by providing an apparatus in which can bodies received directly from a can bodymaker or from any other suitable source of supply, advancing along a straight line path of travel in a substantially continuous procession and in spaced end-to-end relation, are individually fed into an intermittently rotating turret and passed through a beading station and a bead collapsing station to provide the collapsed bead in the bodies, and then are returned to the procession for continued advancement to another apparatus for a subsequent operation or to a suitable place of deposit.

Referring to the drawings:

FIG. 5 is an enlarged sectional view taken substantially along the vertical broken line 5—5 in FIG. 1;

FIG. 6 is a fragmentary top plan view of certain parts of the apparatus as viewed along the line 6—6 in FIG. 1;

FIG. 7 is a side view of the parts shown in FIG. 6;

FIG. 8 is an enlarged fragmentary sectional view as taken substantially along the line 8—8 in FIG. 6;

FIG. 9 is a fragmentary sectional view of certain parts of the apparatus as viewed substantially along the vertical broken line 9—9 in FIG. 1;

FIGS. 10 and 11 are enlarged sectional detail views of certain of the parts shown in the upper portion of FIG. 9;

Figure 12:
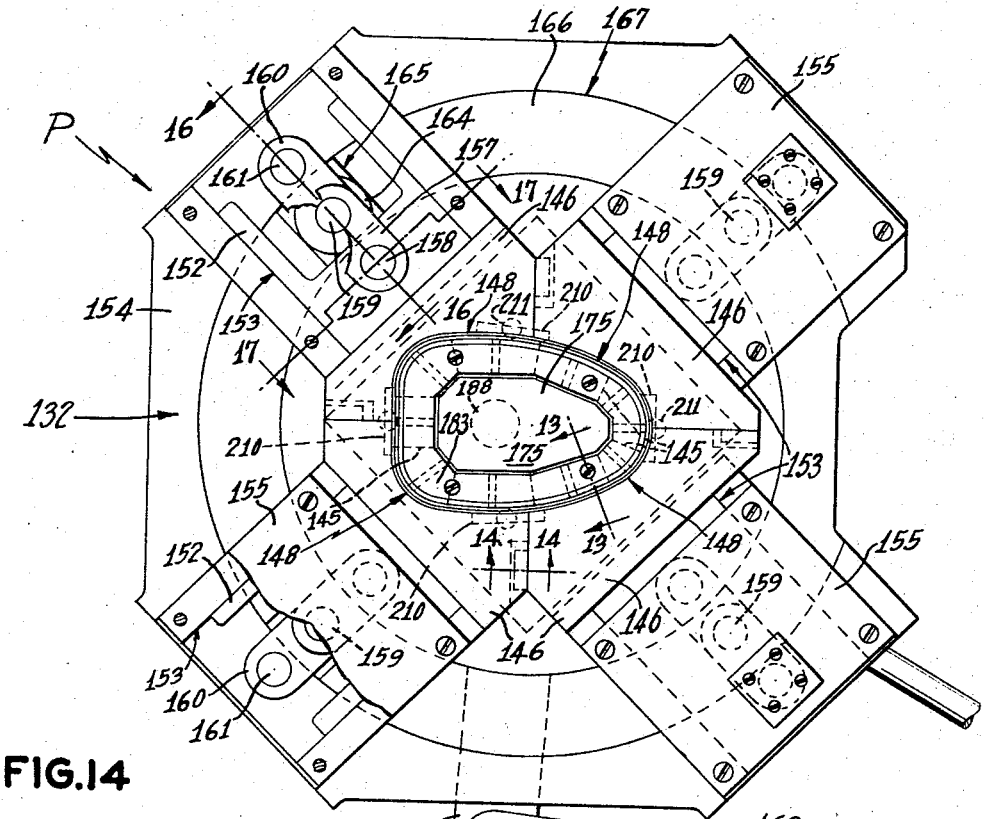
FIG. 12 is an enlarged vertical sectional view of a beading device used in the apparatus, the view being taken substantially along the line 12—12 in FIG. 4.
Figure 14:
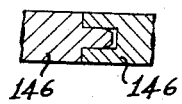
Figure 15:
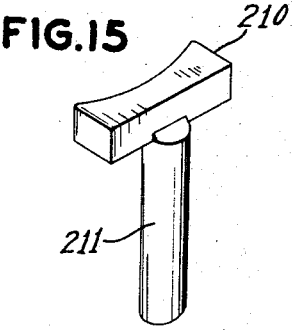
Figure 13:
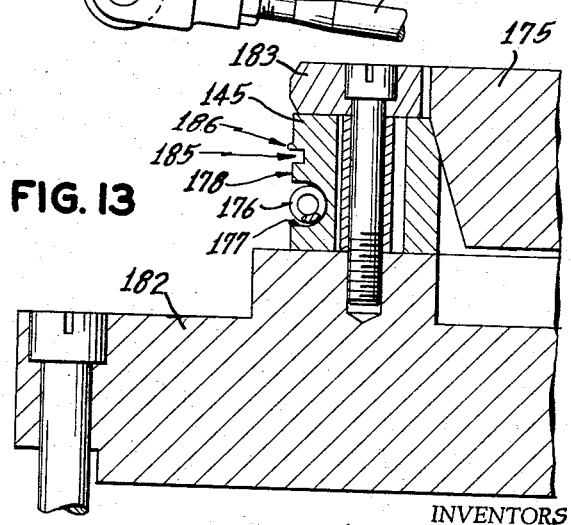
Figure 16:
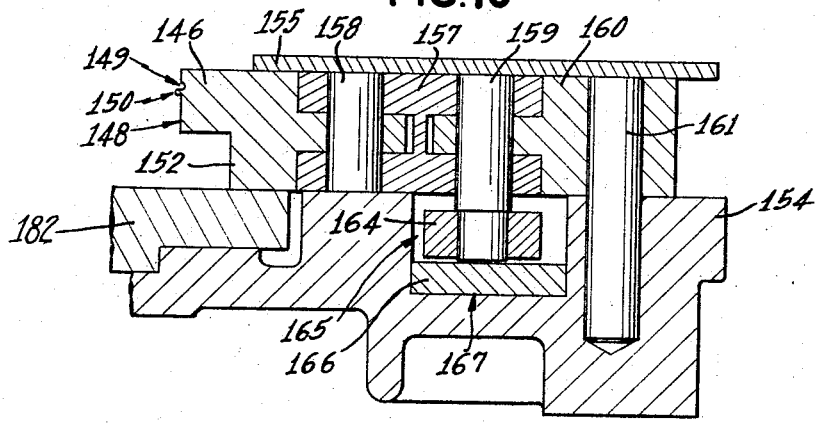
Figure 17:
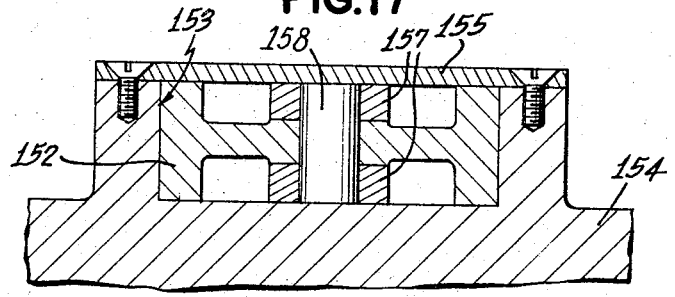
Figure 18:
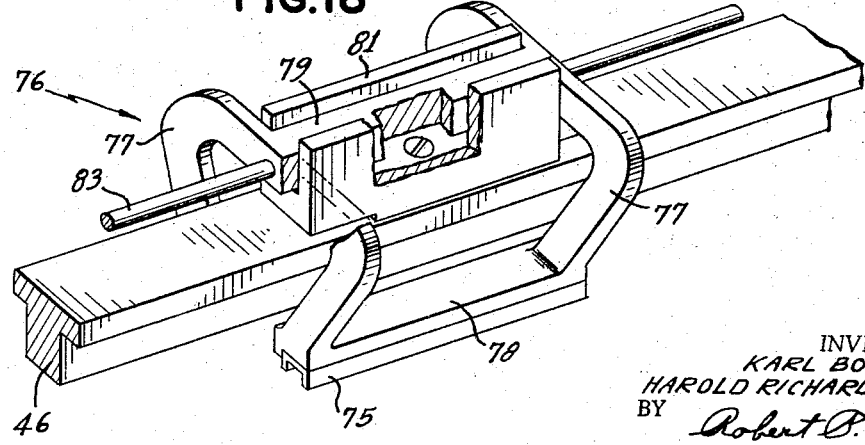
Figure 28:
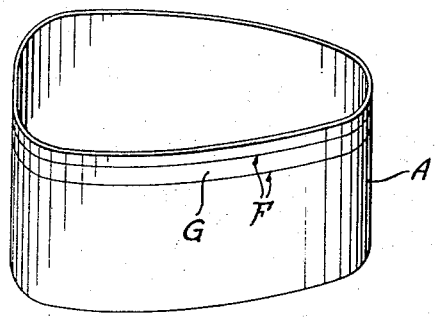
Figure 29:
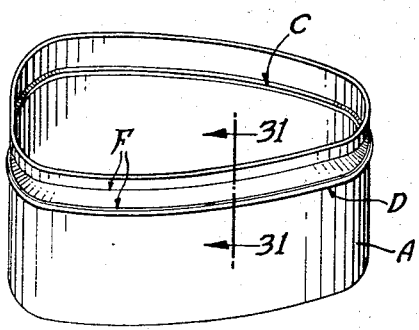
Figure 30:
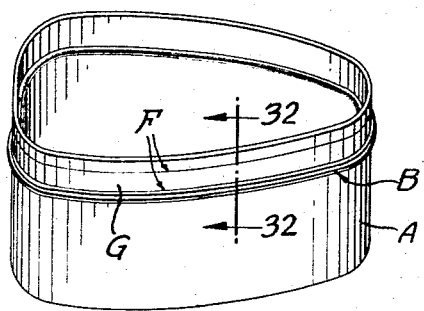
Figure 31:
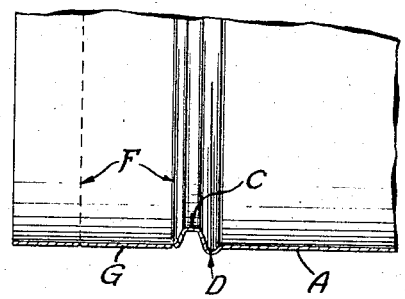
Figure 32:
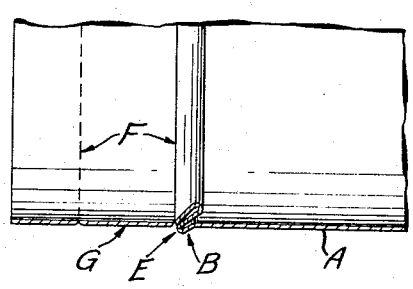

FIGS. 13 and 14 are enlarged sectional detail views of certain parts of the apparatus as viewed along the lines 13—13, and 14—14 in FIG. 12;

FIG. 15 is an enlarged perspective view of one end of a pusher element shown in FIG. 12;

FIGS. 16 and 17 are enlarged fragmentary sectional views taken substantially along the respective lines 16—16 and 17—17 in FIG. 12;

FIG. 18 is an enlarged perspective view of the magnet transfer device shown in FIG. 10 with parts broken away;

FIGS. 19 and 20 are enlarged fragmentary sectional views of certain parts associated with the beading device shown in FIG. 12, the views showing the parts in different operational positions;

FIG. 21 is a fragmentary perspective view of certain of the parts shown in FIGS. 19 and 20;

FIGS. 22, 23, 24 and 25 are enlarged fragmentary sectional views of parts of the beading device shown in FIG. 12, the views showing a can body and the parts during different stages of the body beading operation;

FIGS. 26 and 27 are enlarged fragmentary sectional views of parts of a bead collapsing device, the views showing a can body and the parts during different stages of collapsing the bead;

FIGS. 28, 29 and 30 are perspective views of a can body in various stages of formation, FIG. 28 showing the body prior to beading, FIG. 29 showing the body after beading and FIG. 30 showing the finished body with its bead collapsed;

FIG. 31 is an enlarged sectional view taken substantially along the line 31—31 in FIG. 29; and FIG. 32 is an enlarged sectional view taken substantially along the line 32—32 in FIG. 30.

As a preferred and exemplary embodiment of the instant invention the drawings disclose an apparatus for receiving irregular shaped sheet metal can bodies A (FIG. 28) used in containers for packing whole hams and the like and for producing in the bodies an annular collapsed bead B (FIGS. 30 and 32). As an incident to producing the collapsed bead B, the bodies A are first formed with a pair of adjacently disposed reversed beads comprising an inwardly projecting bead C and an outwardly projecting bead D (FIGS. 29 and 31). This operation is followed by a controlled endwise pressurizing of the body walls which results in the formation of the collapsed bead B. The collapsed bead B in the present case is utilized to provide an outer rounded collar E (FIG. 32) disposed in front of one of a pair of spaced score lines F which define in the body wall a removable tearing strip G; the collar serving to shield and protect the raw edge of the body produced by the tearing out of the strip G.

The apparatus in general comprises a horizontally disposed straight line feeding mechanism M (FIG. 1) which is intersected by an intermittently rotated turret O (FIG. 5) having its axis parallel with the path of travel of the can bodies in the feeding mechanism. The turret receives can bodies A from the feeding mechanism in an endwise relation at a receiving station S (FIG. 1) and carries them to and through a plurality of working stations, which include a can body beading station P (FIG. 5), an idle station Q, a bead collapsing station R and then returns the bodies with their collapsed beads, to the receiving station S of the feeding mechanism for advancement to a subsequent operation apparatus or to any suitable place of deposit.

The feeding mechanism M extends across the top of the apparatus and is supported on a frame 41 (FIGS. 1 and 2) which constitutes the main frame of the apparatus.

Figure 1:
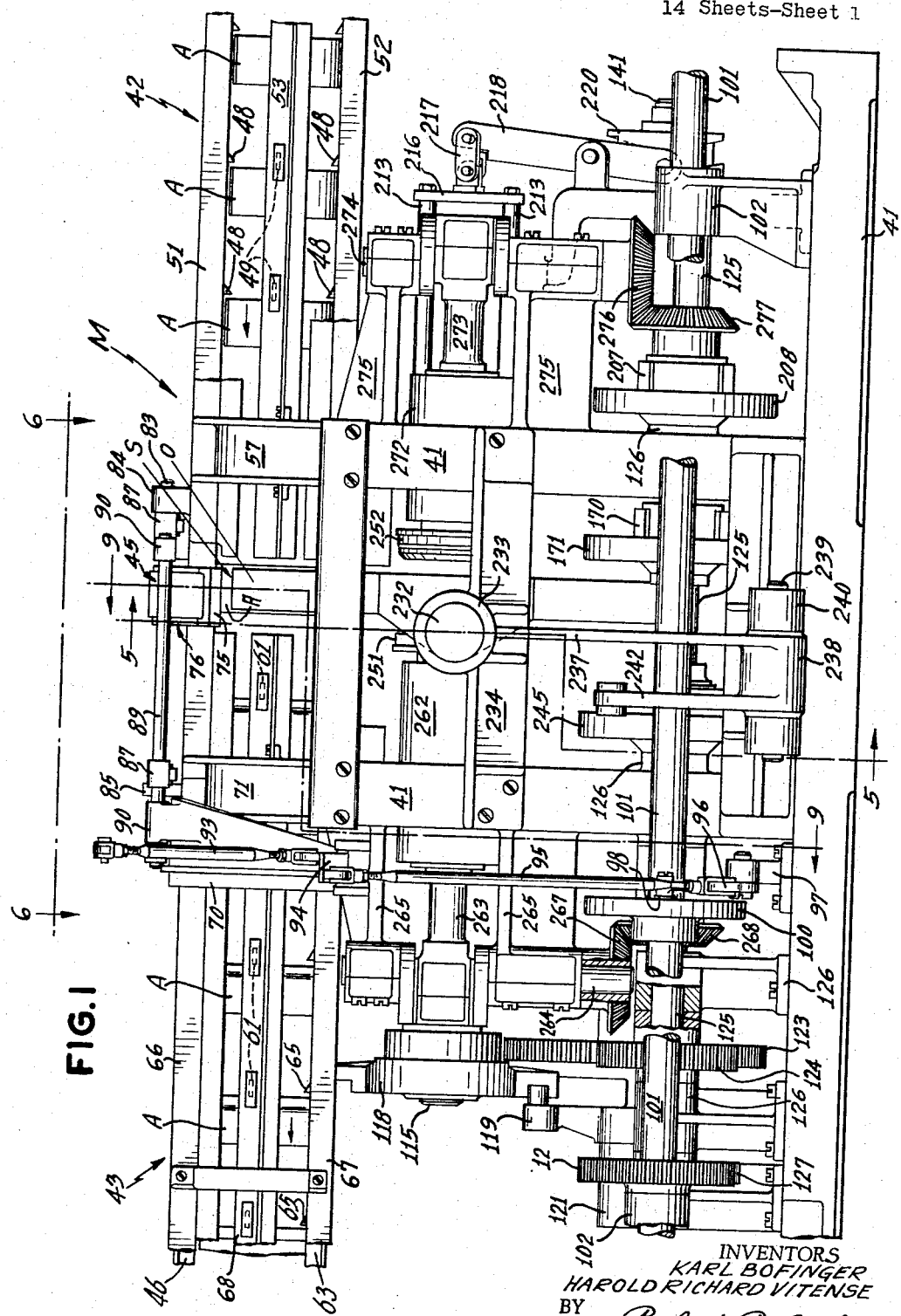
FIG. 1 is a side elevation of the apparatus embodying the instant invention, with parts broken away.
Figure 2:
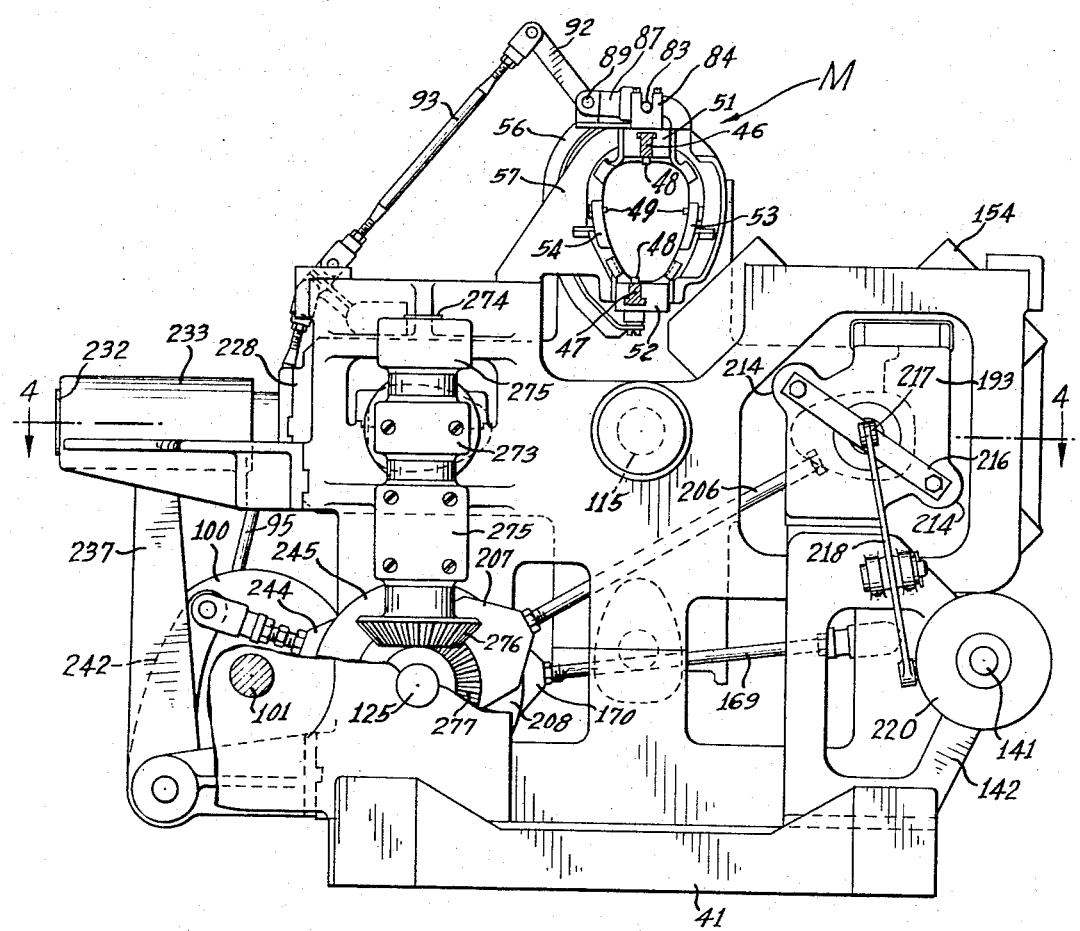
FIG. 2 is an end elevation of the apparatus as viewed from the right in FIG. 1.

This feeding mechanism comprises two sections, an entrance feed section 42 (at the right in FIG. 1) and an exit feed section 43 (at the left in FIG. 1). The two sections are disposed in endwise alignment and are spaced apart a distance sufficient to accommodate the turret O and its required clearance. In addition to this, there is provided a traveling magnet transfer device 45 to transfer beaded can bodies from the turret to the exit feed section of the feeding mechanism.

The entrance feed section 42 comprises a set of two reciprocable stroke bars 46, 47 (FIGS. 2 and 7) which act together and which have spaced feed dogs 48 for propelling engagement behind the can bodies A. To hold the cans in their advanced position, there are provided hold-back fingers 49. These stroke bars are slidably disposed in horizontal rails 51, 52 and the hold-back fingers are fixed on rails 53, 54 all of which are secured to surrounding spaced brackets 56 and to supporting brackets 57 mounted on the main frame 41. The horizontal rails constitute an outside horn or mandrel for supporting the can bodies A.

Unbeaded can bodies A are received in the horn or mandrel direct from a can bodymaker or other suitable source of supply and are advanced along the horn toward the turret O (toward the left in FIG. 1) in spaced and endwise alignment by reciprocation of the stroke bars in conventional manner. The stroke bars are reciprocated in unison in any suitable manner, preferably by the subsequent operation machine. The stroke bars feed the bodies endwise and individually into the turret O for the beading and collapsing operations which will be explained hereinafter. As hereinbefore mentioned, the bodies following the operations performed upon them, are returned to their original receiving station S for transfer from the turret into the exit feed section 43.

The exit feed section 43 like the entrance feed section 42 comprises an extension of the top stroke bar 46 and an auxiliary stroke bar 63 which act together and which are actuated by the stroke bar 46. On the sides are fixed hold-back fingers 61, 62. The auxiliary bar is provided with feed dogs 65. These stroke bars are slidably disposed in horizontal rails 66, 67 and the hold-back fingers are fixed on rails 68, 69 all of which are secured to surrounding spaced brackets 70 and to supporting brackets 71 mounted on the main frame 41. The rails 66 and 51 are a single solid piece extending through the machine, rail 51 being at the entrance end and rail 66 being at the exit end. The horizontal rails constitute an outside horn or mandrel for supporting the beaded can bodies A.

The traveling magnet transfer device 45 which transfers the beaded can bodies A from the turret O to the exit feed section 43 comprises a pair of permanent magnets 75 (FIGS. 7, 10 and 18) which are disposed one on each side of the top stroke bar 46 of the can body feed mechanism. These magnets 75 are movable vertically and horizontally to pick up the can body in the turret O, to transfer the body from the turret to the exit feed section, to release the can body in the exit feed section and to return to the turret for the next can body. For this purpose the magnets 75 are secured to a transfer member 76.

The transfer member 76 preferably comprises a pair of spaced horse shoe shaped arms 77 which straddle the stroke bar 46. The lower ends of the arms 77 on each side of the stroke bar are connected by elongated pads 78 which are parallel to the stroke bar. The magnets 75 are secured to these pads.

Above the stroke bar 46, the two spaced arms 77 are formed with an elongated, square, connecting slide element 79 (FIG. 10) which is vertically slidable in a U-shaped housing 81 which is disposed above the top rail 51 of the feed mechanism and is secured to the stroke bar 46 is best shown in FIG. 10. The arms 77 confine the slide element 79 endwise in the housing.

Hence the housing 81 moves with the stroke bar 46 in a horizontal direction and thereby carries the transfer member 76 with it to shift the magnets horizontally through a transfer stroke from the turret O to the exit feed section 43 and thence through a return stroke from the exit feed section to the turret.

Figure 3:
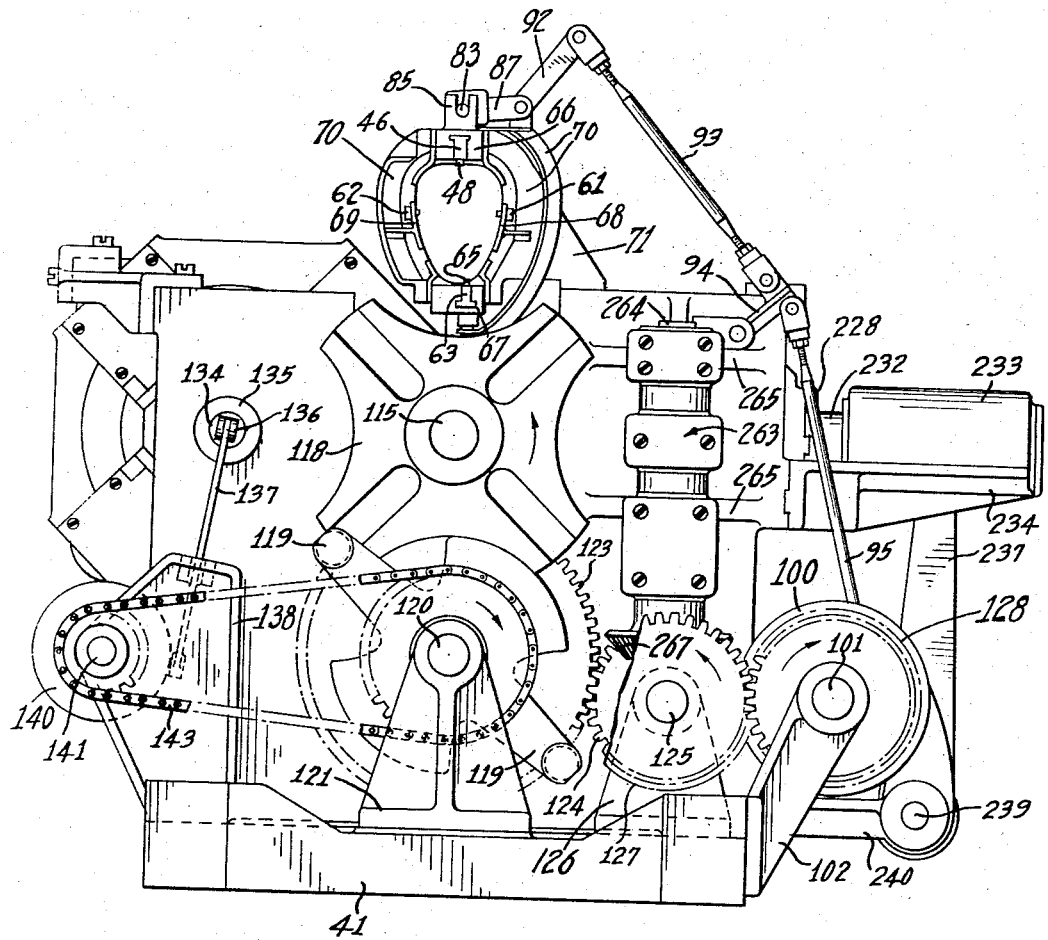
FIG. 3 is an end elevation of the apparatus as viewed from the left in FIG. 1.

The vertical movement of the transfer member 76 in the housing 81 to pick up the can body in the turret O and to release the body in the exit feed section is preferably effected by cam action. For this purpose the square connecting element 79 is loosely carried on a horizontal rod 83 (FIGS. 1, 6, 7, 8 and 10) which is disposed above and parallel with the stroke bar 46. The ends of the rod 83 are loosely seated for bodily vertical movement in a pair of U-shaped lugs 84, 85 (see also FIGS. 2 and 3) secured to the top rails 51, 66 of the respective entrance and exit feed sections.

The rod 83 is lifted bodily by a pair of lift arms 87 the inner ends of which are bifurcated and carry square blocks 88 (see FIG. 11) which are loosely mounted on the rod 83 adjacent the U-shaped lugs 84, 85. The lift arms 87 are secured to an oscillatable horizontal shaft 89 journaled in a pair of spaced bearings 90 secured to the top rail 51 and to the bracket 70 respectively.

The shaft 89 is oscillated by a lever 92 (FIGS. 6 and 9) which is secured to the shaft. The free end of the lever is pivotally connected to a link 93 which is pivotally connected to a pivot arm 94 mounted on the main frame 41. The pivot arm in turn is connected by a link 95 to one leg of a bell crank 96 pivotally mounted on a bracket 97 secured to the base of the main frame 41 (see also FIG. 1). The other leg of the bell crank 96 carries a cam roller 98 which operates in a cam groove 99 of a cam 100 mounted on a shaft 101 which constitutes the main drive shaft of the apparatus. The drive shaft 101 is journaled in bearing brackets 102 secured to the base of the main frame 41. This shaft is rotated continuously in any suitable manner in time with the reciprocation of the stroke bars of the feeding mechanism M.

The turret O preferably comprises a pair of spider shaped spaced and parallel side walls 105 (FIGS. 4 and 5) connected by webs 106 to provide four legs 107 spaced 90 degrees apart. The depth of legs, in a direction parallel to the axis of the turret, is slightly narrower than the height of a can body A so that a body received in the turret projects slightly beyond each side of the receiving leg. The outer end of each leg is formed with a trough or recess 108 extending parallel with the axis of the turret and being defined by a pair of spaced shoulders 109 connected by a sunken panel or flat wall 110. The wall 110 and the adjacent portions of the side walls 105 of each leg are formed with a transverse pocket 111 shaped to fit a major portion of a can body A as best shown in FIG. 5. Permanent magnets 112 carried in the turret adjacent each side of each pocket 111 are provided to hold can bodies in place in the pockets. It is this leg portion of the turret that intersects the path of travel of the can bodies A moving through the feed mechanism M hereinbefore described.

The turret O is rotated intermittently in time with the reciprocation of the stroke bars in the feed mechanism, to rotate a leg 107 of the turret into the receiving station S and to locate its pocket 111 in alignment with the outside horns of the entrance and exit feed sections 42, 43 for the transfer of a beaded can body A from the turret to the exit feed and for the simultaneous transfer of an unbeaded body from the entrance feed to the turret as mentioned hereinbefore. For this purpose the turret O is provided with an elongated hub 114 (FIGS. 4 and 5) which is mounted on a turret shaft 115 disposed below and in parallelism with the feed mechanism M. The shaft is journaled in a plurality of spaced bearings 116 in cross webs of the main frame 41.

Figure 4:
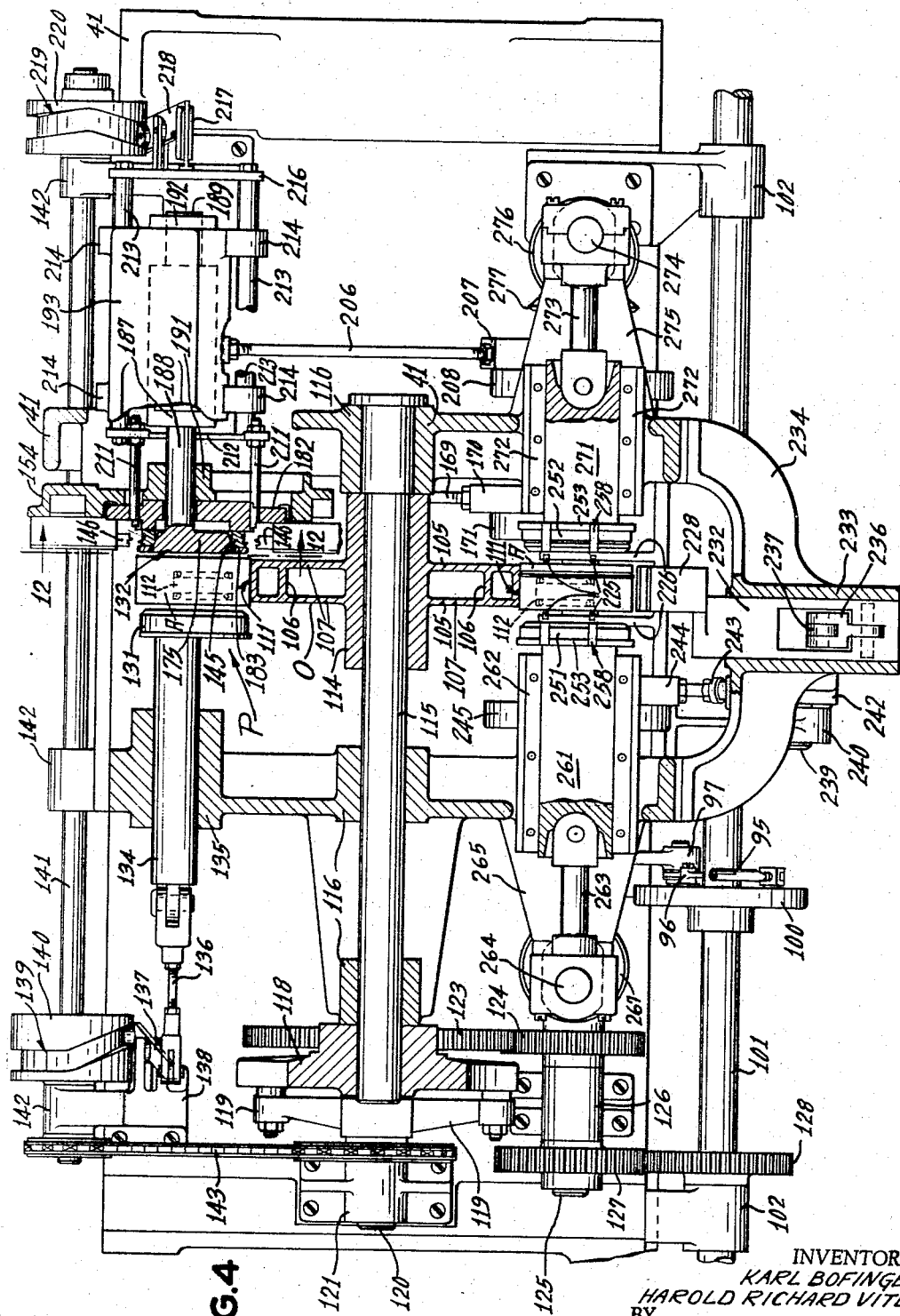
FIG. 4 is a plan sectional view taken substantially along the horizontal line 4—4 in FIG. 2.

One end of the turret shaft 115, at the left as viewed in FIG. 4, carries a Geneva indexing wheel 118 (see also FIG. 3) which is periodically rotated by a pair of oppositely disposed indexing arms 119 mounted on a continuously rotated indexing shaft 120 journaled in a pair of spaced bearing brackets 121 mounted on the base of the main frame 41.

The indexing shaft 120 is rotated by a spur gear 123 which is mounted on the shaft and which meshes with a driven gear 124 mounted on a driven shaft 125 disposed parallel with and adjacent the main drive shaft 101. This driven shaft 125 extends the full length of the apparatus and is journaled in a plurality of bearing brackets 126 (FIG. 1) formed in and mounted on the main frame 41. One end of the shaft 101, at the right in FIGS. 1 and 4, is journaled in the bearing bracket 102. The opposite end of the shaft 125 carries a gear 127 which meshes with and is driven by a gear 128 on the main drive shaft 101. Through this gear train the turret O is periodically rotated in a counterclockwise direction as viewed in FIGS. 3 and 5.

Upon reception of a can body A in a pocket 111 of the turret O at the receiving station S, the turret is rotated through one indexing step toward the left as viewed in FIG. 5, to bring the body A to rest at the beading station P as shown in FIG. 5. As a safety measure, a curved guide rail 129 secured to the main frame 41 is provided for cooperation with the magnets 112 to retain the body in its pocket during this travel.

At the beading station P the can body A is in endwise alignment with a pusher head 131 located on one side of the turret O and a beading device 132 located on the opposite side of the turret as best shown in FIGS. 4 and 22. The pusher head 131 is formed on one end of a slide bar 134 mounted in a bearing 135 in the main frame 41. The opposite end of the slide bar 134 is pivotally connected by a link 136 to a cam lever 137 pivotally mounted in a bracket 138 secured to the main frame 41 (see also FIG. 3). The cam lever 137 carries a cam roll which operates in a cam groove 139 of a cam 140 mounted on a cam shaft 141 journaled in spaced bearings 142 formed in the main frame and in brackets attached to the frame. The shaft 141 is continuously rotated in time with the other parts of the apparatus by a sprocket and chain connection 143 with the indexing shaft 120.

While the turret O is at rest, the cam 140 slides the pusher head 131 towards the right as viewed in FIG. 4 and thereby causes the pusher head to slide into and support one end of the can body A. During this travel a shoulder 133 on the head engages and pushes the body partly out of the turret into the position shown in FIG. 23 where the portion of the body to be beaded is disposed in the beading device 132.

The beading device 132 comprises inside beading jaws 145 and outside beading jaws 146 (FIGS. 12 and 23) between which the can body is temporarily interposed for the beading operation. There are four outside beading jaws 146 spaced 90 degrees apart in radial relation around the axis of the can body and having tongue and groove slide connections as shown in FIG. 14. Each of these jaws, in general, are of triangular configuration and are formed with a curved face 148 corresponding in shape to the shape of the portion of the can body with which the face is to engage, as best shown in FIGS. 12 and 16. Each of these faces are formed with a bead forming groove 149 and an adjacently disposed bead forming projection 150.

These outside jaws 146 are formed on the forward or inner ends of slides 152 (FIGS. 12, 16 and 17) which operate in radial slideways 153 formed in a vertically disposed support plate 154 (see also FIG. 4) secured to the main frame 41. A cover plate 155 over each slideway retains the slides against displacement therefrom.

The slides 152 are reciprocated in unison in time with the other parts of the apparatus to move the jaws 146 toward and away from the located can body A for the beading operation. For this purpose each slide is provided with a toggle device connected to the support plate. Each toggle device comprises a link 157 (FIGS. 12, 16 and 17) connected at its ends to a pivot pin 158 in the slide and to a pivot pin 159 in an auxiliary link 160 which is connected to a stationary pivot pin 161 secured in the support plate 154.

Reciprocation of each jaw 146 through its toggle device is effected by a roller 164 which is mounted on the lower end of each pivot pin 159. These rollers 164 operate in radial or transverse grooves 165 formed in an actuating ring 166 slidably disposed in a raceway 167 in the support plate 154. The ring 166 is oscillated in its raceway in time with the other parts of the apparatus, by an attached arm 168, the outer end of which is pivotally connected to a link 169 which terminates in a bifurcated shoe 170 straddling the driven shaft 125 (see also FIG. 1). The shoe 170 carries a cam roller which operates in a cam groove of a face cam 171 mounted on the shaft 125.

Hence the cam 171 during its rotation with the driven shaft 125 reciprocates the link 169 which in turn oscillates the ring 166 and thus actuates the toggle devices to reciprocate the slides and the jaws 146 attached thereto through a beading stroke to effect the beading of the can body in cooperation with the inside jaws 145 (the position shown in FIG. 12) and thence through a return stroke to the position shown in FIG. 5 to retract the jaws to permit withdrawal of the beaded can body.

The cooperating inside beading jaws 145 are of the sectional expander type jaw arranged around an expanding wedge or cam 175 (FIGS. 12 and 13) and yieldably tied together by an encircling coiled spring 176 disposed in a groove 177 in the outer faces 178 of the jaws. There are ten of these inside jaws 145 and taken collectively their outer faces 178 are shaped to conform to the shape of the inside surface of the can body when the jaws are in expanded position as shown in FIG. 12.

The bottoms of each of the jaws 145 are formed with a substantially radial tongue 180 (FIG. 23) which slide in slideways 181 formed in a guide member 182 to guide the jaws in their travel. The guide member 182 is secured to the face of the support plate 154 (see also FIG. 4). A ring 183 on top of the jaws and secured to the guide plate 182 as shown in FIG. 13 retains the jaws in position. The outer face 178 of each jaw is formed with a beading groove 185 and an adjacently disposed beading projection 186 for cooperation with the grooves 149 and projections 150 of the outside jaws 146 to produce the reversed beads C and D (FIG. 31) in the body.

The wedge 175 is shifted axially within the inside jaws 145 to expand the jaws for the beading operation and to permit the spring 176 to contract them following the beading operation. This shifting of the wedge is effected through a movable toggle housing 187 (FIGS. 4, 19, 20, 21) having aligned trunnions 188, 189 which are axially slidable in a bearing 191 formed in the support plate 154 and a bearing 192 formed in cover bracket 193 secured to the support plate 154 and to the main frame 41. The wedge 175 is secured to the outer end of the trunnion 188 as shown in FIG. 19.

The toggle housing 187 carries a pair of U-shaped toggle links 195, 196 (see FIG. 21) pivotally connected together by a pin 197 which extends through the free ends of the link 195 and a hub 198 of the link 196. The free ends of the link 196 straddle and are pivotally connected by a pin 199 to a boss 200 in the housing. The hub end of the link 195 is pivotally connected by a pin 201 to the cover bracket 193; the pin 201 serving as an anchor for the entire toggle device.

Operation of the toggle links in the housing 187 is effected by a yoke 203 which surrounds the hub 198 of the link 196. The upper end of the yoke is provided with a guide pin 204 which is slidable in a bearing 205 in the cover bracket 193. The lower end of the yoke is secured to a link 206 which terminates in a bifurcated shoe 207 (FIGS. 1, 2 and 4) which straddles the driven shaft 125 and carries a cam roller which operates in a cam groove in a face cam 208 mounted on the shaft 125.

Figure 24:
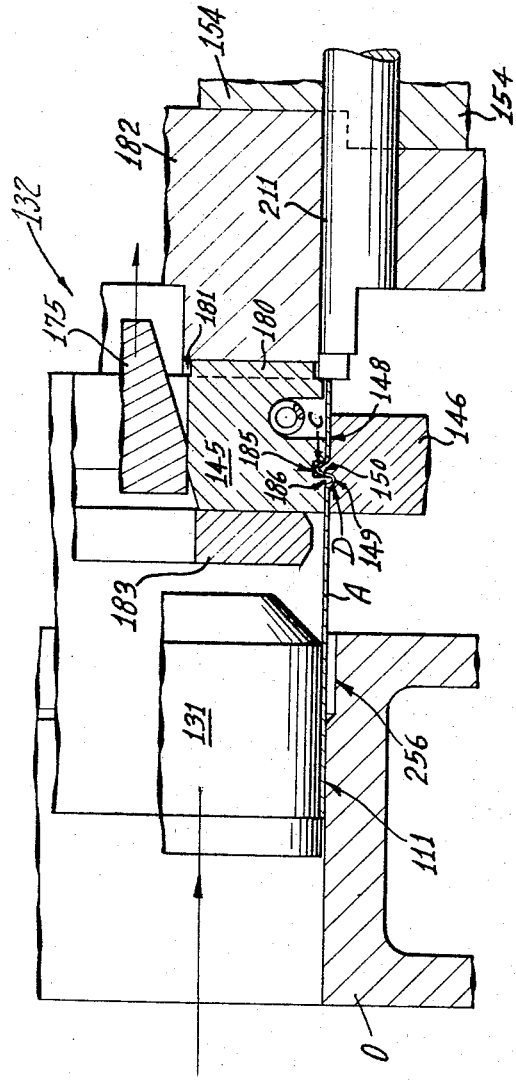

Hence the rotation of the driven shaft 125 rotates the cam 208 and reciprocates the link 206 in time with the other moving parts of the apparatus to actuate the toggle device in the toggle housing 187. This action shifts the toggle housing 187 and the wedge 175 connected thereto through a jaw expanding stroke, toward the right, from the position shown in FIG. 19 to the position shown in FIG. 20 and thence through a return stroke from the position in FIG. 20 to the position in FIG. 19. The expanding and contracting action of the inside jaws 145 takes place simultaneously with the expanding and contracting action of the outside jaws 146 so that both sets of jaws simultaneously and cooperatively move toward and form the reversed beads C and D (FIG. 31) in the positioned can body A as shown in FIG. 24 and then move away from the body to release it for further advancement to the next station by the turret O.

Figure 25:
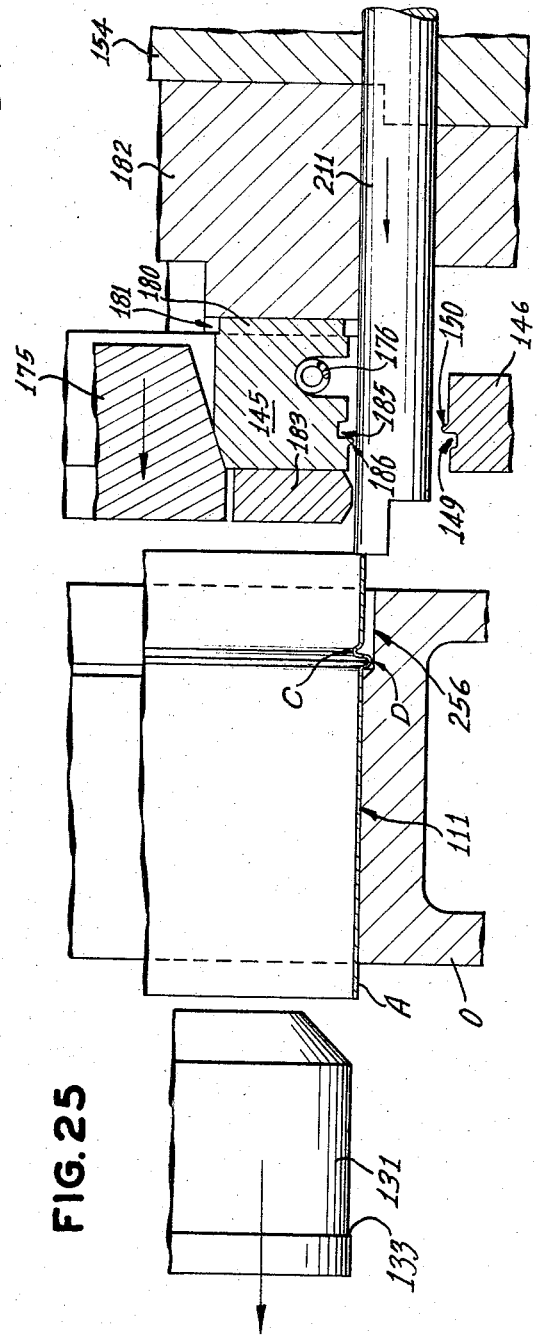

As soon as the beads have been formed in the can body A, the body is pushed endwise, back into its original position in its pocket 111 of the turret O, as shown in FIG. 25. This relocating of the can body is effected by a set of four knock-out blocks 210 (FIGS. 4, 12 and 15) formed on rods 211 which are distributed at spaced intervals around the end of the can body and disposed in bearing holes in the guide member 182 (see FIGS. 19 and 20). The outer ends of the rods 211 are secured to a movable vertically disposed web 212 (FIG. 4) which is reciprocated horizontally by a pair of bars 213 connected to the web and slidably supported in bearings 214 in the cover bracket 193.

The outer ends of the bars 213 are fastened to a beam 216 (see FIGS. 2 and 4) which is connected by a link 217 to the upper end of a cam lever 218 (also FIG. 1) pivotally attached to the bracket 142 on the main frame 41. The lower end of the lever 218 carries a cam roller which operates in a cam groove 219 of a cam 220 mounted on the continuously operating cam shaft 141. Hence the cam shaft 141 actuates the knock-out blocks 210, in timed relation with the other moving parts of the apparatus, to push the beaded can body A back into its original position in the turret O as mentioned above.

With the beaded can body A back into position in its turret pocket 111, the turret O is indexed or partially rotated through its second step of operation to locate and hold the body at the idle station Q (FIG. 5) while bodies at other stations are being operated upon. This is followed by the third indexing step in the cycle of operation to shift the can body into and to locate it at the collapsing station R as shown in FIG. 26.

At the collapsing station R, an endwise pressure is exerted against the can body to bend the reversed beads C and D into an angular overlapping relationship as shown in FIG. 27 to produce the collapsed bead B. At this station the body, at rest, remains in the pocket 111 of the turret O and is disposed between two pairs of stationary stripper elements 225 (FIGS. 5 and 26) carried in two brackets 226 secured to the main frame 41.

As soon as the body comes to rest at the collapsing station R, it is properly registered in its turret pocket 111 by a locating head 228 (FIG. 5) which is substantially the same width as the turret O and which is located adjacent the periphery of the turret in horizontal alignment with the turret pocket. The inner face of the locating head 228 is formed with a recess 229 of a shape to snuggly engage around the portion of the can body that protrudes beyond the recess 108 in the face of the leg of the turret. Above and below this recess 229, the locating head is formed with a shaped face 230 of a configuration to match the top wall 110 and the shoulders 109 of the leg of the turret to engage these surfaces to properly register and hold the turret against shifting during the bead collapsing operation.

The locating head 228 is horizontally reciprocable through a locating stroke and thence through a return stroke to clamp against and lock the leg of the turret O in a predetermined location against movement as mentioned above and to surround and back up the protruding portion of the can body. For this purpose the locating head 228 is carried on the inner end of a horizontal slide 232 (FIGS. 1, 4 and 5) slidably mounted in a slide block 233 formed in a bracket 234 secured to the main frame 41. The slide 232 is connected by a link 236 to an actuating arm 237 formed on a hub 238 (see FIG. 1) mounted on a pivot shaft 239 in a bracket 240 secured to the main frame 41. The hub 238 is also formed with a cam arm 242 which at its free end is pivotally connected by a link 243 to a bifurcated shoe 244 which straddles the driven shaft 125. The shoe 244 carries a cam roller which operates in a cam groove of a face cam 245 mounted on the driven shaft 125.

Hence the rotation of the driven shaft 125 rocks the cam arm 242 and the actuating arm 237 to reciprocate the locating head 228 in timed relation with the other moving parts of the apparatus.

The bead collapsing operation takes place after the turret is locked in place and the can body side wall is completely backed-up. This collapsing operation is effected by a pair of oppositely disposed pressure heads 251, 252 (FIG. 4) located one on each side of the turret O in axial alignment with the turret pocket 111. These pressure heads 251, 252 are of the same shape as the can body A and are adapted to fit firmly within the open ends of the body as shown in FIG. 27. Each head is formed with a surrounding shoulder 253 which engages against the end edges of the can body side wall. The inner end of the pressure head 252 is formed with a reduced contour portion 255 having an outer periphery the same as but enough smaller than the outer periphery of the head, so as to engage and wipe the inside bead C of the can body into a collapsed and angularly disposed condition as shown in FIG. 27 when the head 252 is moved into the end of the body. The inner face of the turret pocket 111 adjacent this bead position is also provided with a clearance recess 256 to just clear the outside bead D of the can body. A similar recess 257 (FIG. 5) is provided in the locating head 228 for this same purpose. The two pressure heads 251, 252 are also formed with transverse grooves 258 to clear the stripper elements 225.

The two pressure heads 251, 252 are mounted for simultaneous reciprocation toward and away from each other to effect the bead collapsing operation and to return to their retracted positions. For this purpose the pressure head 251 is secured to the inner end of a horizontally disposed slide 261 (FIG. 4) mounted in a slide bracket 262 attached to the main frame 41. The outer end of the slide 261 is pivotally connected to a crank arm 263 (see also FIG. 1) mounted on a vertically disposed crank shaft 264 journaled in a pair of spaced bearing brackets 265 secured to the main frame 41. The lower end of the crank shaft 264 carries a bevel gear 267 which meshes with and which is continuously rotated by a bevel gear 268 mounted on and driven by the driven shaft 125. Through this driving connection the pressure head 251 is reciprocated in timed relation with the other moving parts of the apparatus.

In a similar manner the oppositely disposed pressure head 252 is secured to the inner end of a horizontally disposed slide 271 (FIG. 4) mounted in a slide bracket 272 attached to the main frame 41. The outer end of the slide 271 is pivotally connected to a crank arm 273 (see also FIG. 1) mounted on a vertically disposed crank shaft 274 (FIG. 4) journaled in a pair of spaced bearing brackets 275 (FIG. 1) secured to the main frame 41. The lower end of the crank shaft 274 carries a bevel gear 276 which meshes with and which is continuously rotated by a bevel gear 277 mounted on and driven by the driven shaft 125. Through this driving connection the pressure head 252 is reciprocated in timed relation with the pressure head 251 and with the other moving parts of the apparatus.

In operation, the two pressure heads 251, 252 simultaneously move toward each other and in so doing enter the ends of the can body A as shown in FIG. 27. During this head movement the reduced portion 255 of the head 252 engages the inside bead C of the can body and bends it into the angular position shown in FIG. 27. This is a combined bending and wiping action which squeezes and turns the inside bead C against and relative to the outside bead D while the latter is backed-up or supported by the turret wall in the recess 256 of the turret pocket and while the endwise pressure of the moving heads 251, 252 is being applied and continued on the side wall of the body. This action results in a flattening or squeezing together of the side walls of the inside bead C and a turning of the flattened bead at the base of the outside bead D which draws the outside bead toward the inside bead while simultaneously partially flattening and inclining the outside bead into a position substantially overlapping the inside bead. This combined endwise pressure and wiping and bending action results in the collapsed bead B as shown in FIG. 27.

Following this bead collapsing operation, the two pressure heads 251, 252 are retracted and thereby withdraw from the ends of the can body leaving the body in the turret pocket 111. During this retracting action the stripper elements 225 on each side of the turret hold the body against endwise movement in the turret as the pressure heads are withdrawn. The locating head 228 is simultaneously retracted to leave the body free.

Following this retracting action of the pressure heads and the locating head the turret O is indexed through its 4th step in its cycle to return the can body with its collapsed bead to the receiving station S as hereinbefore mentioned. At this station, when the turret comes to rest, the magnet transfer device 45 operates, to pick up the beaded body and to transfer it from the turret pocket into the exit feed section 43 of the feeding mechanism M. Simultaneously with this action the stroke bars of the entrance feed section 42 advance a new unbeaded can body A into the turret pocket just emptied by transfer of the beaded body therefrom. The beaded body in the exit feed section 43 is engaged by the stroke bars of this feed section to advance the body intermittently toward its subsequence operation machine or other place of deposit while the turret O which has just completed a cycle of operation, is started through a new cycle.

It is thought that the invention and many of its attendant advantages will be understood from the foregoing description and it will be apparent that various changes may be made in the form, construction and arrangement of the parts without departing from the spirit and scope of the invention or sacrficing all of its material advantages, the form hereinbefore described being merely a preferred embodiment thereof.

We claim:

1. An apparatus for producing a collapsed bead in a can body, comprising a turret having spaced pockets for holding can bodies, means for intermittently rotating said turret to move its pockets successively into and through a plurality of stations disposed adjacent said turret, a feeding mechanism disposed at one of said stations for feeding a can body endwise into and out of the pockets of said turret, beading instrumentalities located at another of said stations for producing a pair of adjacently disposed reversed annular beads in the side wall of can bodies in said turret pockets, and bead collapsing elements disposed at another of said stations for exerting an endwise pressure on can bodies in said turret pockets to bend and turn said reversed beads into a collapsed partially overlapping position to produce a collapsed bead in said can bodies.

2. An apparatus of the character defined in claim 1 wherein said feeding mechanism comprises an entrance feed section disposed adjacent one side of said turret and an exit feed section disposed adjacent the opposite side of said turret.

3. An apparatus of the character defined in claim 2 wherein said entrance feed section and said exit feed section are disposed in endwise alignment, and wherein there is provided a transfer device for transferring can bodies from the pockets of said turret to and into said exit feed section.

4. An apparatus of the character defined in claim 3 wherein said transfer device comprises a movable transfer member, a magnet attached to said member, and means for moving said member toward and away from a can body in said turret pocket to pick up a said body and for moving said member between said turret and said exit feed section to transfer the picked-up body to said exit feed section.

5. An apparatus of the character defined in claim 2 wherein said feed sections each comprise a plurality of spaced and parallel stroke bars having spaced dogs for propelling engagement behind can bodies, said stroke bars being actuated in unison, and wherein there is provided a transfer device for transferring can bodies from the pockets of said turret to and into said exit feed section.

6. An apparatus of the character defined in claim 1 wherein said pockets are formed in the periphery of said turret and wherein there is provided magnets in said turret adjacent said pockets for retaining can bodies in said pockets.

7. An apparatus of the character defined in claim 1 wherein said beading instrumentalities include inside and outside expansible and contractile bead squeezer jaws disposed adjacent one side of said turret in endwise alignment with a turret pocket brought to rest at a beading station, and wherein there is provided a pusher head located adjacent the opposite side of said turret in endwise alignment with said turret pocket, means operating in time with the rotation of said turret for reciprocating said pusher head toward and away from said turret to push a pocketed can body endwise in its turret pocket to locate one end of said body into a predetermined position between said inside and outside squeezer jaws, and means operating in time with said pusher head for moving said jaws toward said positioned portion of said can body to produce said reversed beads therein.

8. An apparatus of the character defined in claim 7 wherein said pusher head is formed with a body portion insertable into said pocketed can body for supporting said body during the beading operation.

9. An apparatus of the character defined in claim 7 wherein there is provided adjacent said inside squeezer jaws a plurality of spaced knock-out elements engageable with the beaded end of said pocketed can body for returning said body to its original position in said turret pocket after said beading operation, and means for actuating said knock-out elements in time with the operation of said jaws.

10. An apparatus of the character defined in claim 1 wherein said bead collapsing elements include a pair of spaced pressure heads disposed one on each side of said turret in axial alignment with each other and with a turret pocket at rest at a bead collapsing station, said pressure heads having portions engagable with the interior surface of the side wall of a pocketed can body to support said body, one of said pressure heads having a reduced portion engageable with the inside bead of said body, and means for moving said pressure heads toward each other with the can body disposed in its turret pocket and in endwise relation to said heads for exerting an endwise pressure against the ends of said can body to produce said collapsed bead in said pocketed can body.

11. An apparatus of the character defined in claim 10 wherein there is provided stationary stripper fingers disposed on each side of said turret adjacent the path of travel of said pressure heads for retaining a can body in its turret pocket during the retraction of said pressure beads following a bead collapsing operation.

12. An apparatus of the character defined in claim 1 wherein said turret pockets are formed in the periphery of said turret, said pockets being of a depth to provide for a portion of a pocketed can body to extend beyond said turret periphery and wherein there is provided for cooperation with said bead collapsing elements a locating head disposed in radial alignment with said turret adjacent the periphery thereof, said locating head having a recess of the shape of the exposed portion of a pocketed can body for surrounding said exposed portion for backing up said can body in cooperation with said turret pocket during the bead collapsing operation, and means operating in time with the rotation of said turret for moving said locating head into and out of operative position.

13. An apparatus of the character defined in claim 1 wherein there is provided a contoured face in the periphery of said turret adjacent each pocket and wherein there is provided for cooperation with said bead collapsing elements a locating head disposed in radial alignment with said turret adjacent the periphery thereof, said locating head having a contoured face matching the contoured face of said turret for locking engagement therewith when the turret is at rest to register a turret pocket and its can body in axial alignment with said bead collasping elements for the bead collapsing operation, and means operating in time with the rotation of said turret for moving said locating head into and out of locking position.

14. An apparatus for producing a collapsed bead in a can body, comprising a feeding mechanism for advancing can bodies in spaced and endwise relation along a straight line path of travel, said feeding mechanism including an entrance feed section and an exit feed section, a rotatable turret intersecting the path of travel of said can bodies in said feed mechanism between said entrance feed section and said exit feed section, said turret having peripherally disposed pockets shaped to receive and hold a can body, means for intermittently rotating said turret to successively align its pockets with a body receiving station in said feeding mechanism and a plurality of working stations and a return to said receiving station, a transfer device disposed adjacent said feeding mechanism for transferring can bodies from said turret to said exit feed section simultaneously with the feeding of a can body by said entrance feed section into said turret, and means for actuating said feed mechanism and said transfer device in timed relation with the rotation of said turret.

References Cited by the Examiner

UNITED STATES PATENTS

| 383,507 | 5/1888 | Walsh | 113—120 |
| 1,698,285 | 1/1929 | Walter | 113—120 |
| 1,705,843 | 3/1929 | Walter | 113—120 |
| 2,014,706 | 9/1935 | Sullivan | 113—1 |

FOREIGN PATENTS 507,775  6/1939  Great Britain.

CHARLES W. LANHAM, *Primary Examiner.*

R. D. GREFE, *Assistant Examiner.*